(12) United States Patent
Onuma (10) Patent No.: US 11,358,544 B2
(45) Date of Patent: Jun. 14, 2022

(54) WIRE HARNESS INCLUDING INTERNAL PRESSURE ADJUSTER

(71) Applicant: Yazaki Corporation, Tokyo (JP)

(72) Inventor: Masanori Onuma, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/195,616

(22) Filed: Mar. 8, 2021

(65) Prior Publication Data

US 2021/0291758 A1 Sep. 23, 2021

(30) Foreign Application Priority Data

Mar. 18, 2020 (JP) .............................. JP2020-047497
Jul. 14, 2020 (JP) .............................. JP2020-120286

(51) Int. Cl.
*B60R 16/02* (2006.01)
*H02G 3/08* (2006.01)
*H01B 7/282* (2006.01)

(52) U.S. Cl.
CPC ....... *B60R 16/0215* (2013.01); *H01B 7/2825* (2013.01); *H02G 3/088* (2013.01)

(58) Field of Classification Search
CPC ... H01B 7/2825; H02G 3/088; B60R 16/0215
USPC ...................................................... 174/23 R
See application file for complete search history.

(56) References Cited

U.S. PATENT DOCUMENTS

| 7,612,287 | B2 * | 11/2009 | Ichikawa | H01B 7/285 174/93 |
| 8,367,927 | B2 * | 2/2013 | Sawamura | H02G 15/013 174/23 R |
| 2010/0129629 | A1 * | 5/2010 | Tee | B32B 27/285 156/60 |
| 2010/0212936 | A1 * | 8/2010 | Arai | H01B 7/285 29/857 |
| 2011/0045697 | A1 * | 2/2011 | Sawamura | B60R 16/0207 427/117 |
| 2012/0217036 | A1 * | 8/2012 | Kuriyagawa | H01B 7/28 29/869 |
| 2013/0240265 | A1 * | 9/2013 | Itou | H01B 17/50 174/84 C |
| 2013/0292173 | A1 * | 11/2013 | Inoue | H02G 15/02 174/74 R |
| 2017/0162997 | A1 * | 6/2017 | Miyakawa | H01R 43/005 |

FOREIGN PATENT DOCUMENTS

JP 2019-175790 A 10/2019

* cited by examiner

*Primary Examiner* — Timothy J Thompson
*Assistant Examiner* — Michael F McAllister
(74) *Attorney, Agent, or Firm* — Kenealy Vaidya LLP (57) ABSTRACT

A wire harness includes: a wire routing material including an insulation covering portion having an insulation property and a conductor having conductivity and covered with the insulation covering portion; a water-stopping terminal disposed at at least one end of the wire routing material and having a water-stopping property; and an internal pressure adjuster including a vent disposed at a middle position of the wire routing material so as to bring the inside and the outside of the insulation covering portion into communication, and a moisture-permeable waterproof sheet covering the vent. As a result, the wire harness can appropriately achieve the water-stopping property in the entire wire harness.

5 Claims, 5 Drawing Sheets

WIRE HARNESS INCLUDING INTERNAL PRESSURE ADJUSTER

CROSS-REFERENCE TO RELATED APPLICATION(S)

The present application claims priority to and incorporates by reference the entire contents of Japanese Patent Application No. 2020-047497 filed in Japan on Mar. 18, 2020 and Japanese Patent Application No. 2020-120286 filed in Japan. on Jul. 14, 2020.

BACKGROUND OF THE INVENTION

1. Field of the Invention

The present invention relates to a wire harness.

2. Description of the Related Art

As a technique applied to a conventional wire harness, for example, Japanese Patent Application Laid-open No. 2019-175790 discloses a terminal-equipped electric wire in which a covered conductive wire and a terminal are connected. The covered conductive wire includes a covering portion and a conductive wire exposed from a distal end of the covering portion. The terminal includes a terminal body and a crimping portion. The crimping portion includes a conductive wire crimping portion to which the conductive wire is crimped, a covering crimping portion to which the covering portion is crimped, and a barrel middle portion between. the conductive wire crimping portion and the covering crimping portion. The crimping portion is covered with an anti-corrosion layer, at least in the area from the barrel middle portion to the conductive wire where the conductive wire is exposed. The anti-corrosion layer has a first resin coating layer made of a moisture-curing resin, and a second resin coating layer made of an ultraviolet curing resin, disposed so as to cover the first resin coating layer. The first resin coating layer of the anti-corrosion layer is thinner than the second resin coating layer thereof in the conductive wire exposed area.

The terminal-equipped electric wire according to Japanese Patent Application Laid-open No. 2019-175790 still has room for improvement in, for example, achieving a water-stopping property in a simpler manner.

SUMMARY OF THE INVENTION

The present invention has been made in view of the above circumstances, and an object thereof is to provide a wire harness capable of appropriately achieving a water-stopping property.

In order to achieve the above mentioned object, a wire harness according to one aspect of the present invention includes wire routing material including an insulation covering portion having an insulation property, and a conductor having conductivity and covered with the insulation covering portion; a water-stopping terminal disposed. at at least one end of the wire routing material and having a water-stopping property; and an internal pressure adjuster including a vent disposed at a middle position of the wire routing material so as to bring an inside and an outside of the insulation covering portion into communication, and a moisture-permeable waterproof sheet covering the vent.

According to another aspect of the present invention, in the wire harness, it is possible to further include a low water-stopping terminal disposed at another end of the wire routing material and having a relatively lower water-stopping property than a water-stopping property of the water-stopping terminal.

According to still another aspect of the present invention, in. the wire harness, it is possible to configure that the wire routing material is wired across a first space and a second space having a relatively smaller temperature change than a temperature change of the first space in a vehicle, the water-stopping terminal is located in the first space, and the low water-stopping terminal and the internal pressure adjuster are located in the second space.

According to still another aspect of the present invention, in the wire harness, it is possible to configure that the low water-stopping terminal is an anti-corrosion terminal in which anti-corrosion treatment to prevent corrosion is given to a wire routing material crimping portion that is crimped to the wire routing material, the anti-corrosion terminal having a lower water-stopping property than the water-stopping property of the water-stopping terminal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail based on the drawings. Note that this embodiment is not intended to limit the present invention. Additionally, constituent elements in the following embodiment include those easily replaceable by a person skilled in the art, or those substantially the same.

Embodiment

Figure 1:
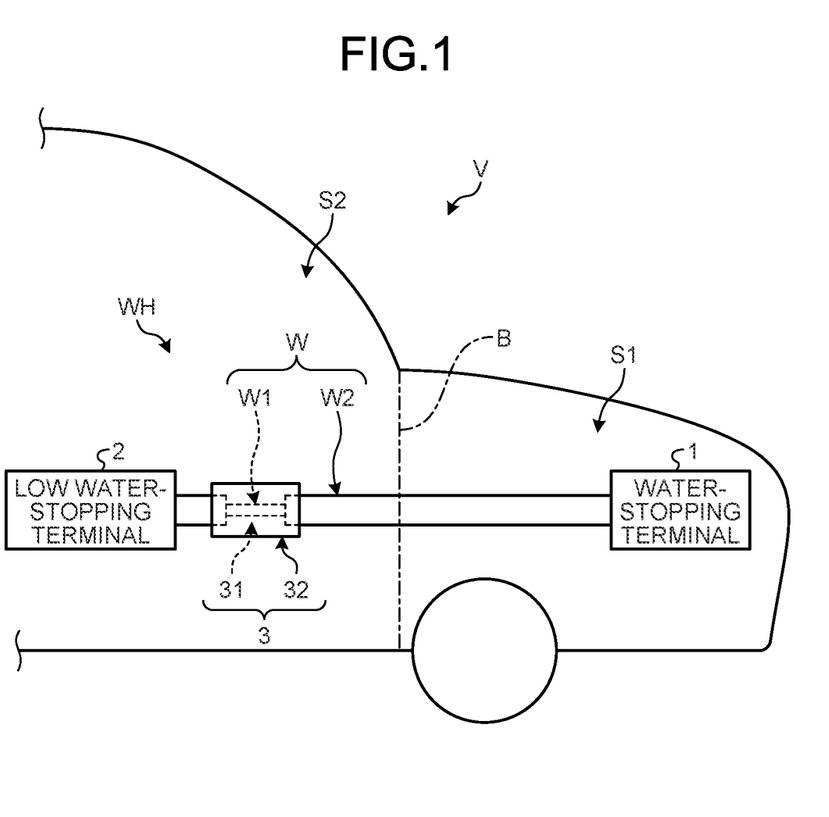
FIG. 1 is a schematic view illustrating a schematic configuration of a wire harness according to an embodiment.

A wire harness WH according to the present embodiment illustrated in FIG. 1 is mounted in a vehicle V. The wire harness WH is obtained by bundling a plurality of wire routing materials W used for power supply or signal communication to form a collective component, for example, for connection between devices mounted in the vehicle V, and connecting the wire routing materials W to the devices by connectors or the like.

The wire harness WH of the present embodiment prevents a pressure difference from being generated within the wire routing material by providing an internal pressure adjuster 3 using a moisture-permeable waterproof sheet 32 at a middle position of the wire routing material W. The wire harness WH thereby achieves a water-stopping property by a relatively simple process. Hereinafter, each configuration of the wire harness WH will be described in detail with reference to each drawing.

Specifically, the wire harness WH includes the wire routing material having conductivity, a water-stopping terminal 1 and a low water-stopping terminal 2 disposed at ends of the wire routing material W, and the internal pressure adjuster 3. Note that the wire harness WH may further include various constituent components such as an exterior member including a corrugate tube and a grommet, an electrical connection box, and a fixture.

The wire routing material is wired in the vehicle V so as to electrically connect the devices. The wire routing material W includes a wire-shaped conductor W1 having conductivity, and an insulation covering portion W2 having an. insulation property (see FIGS. 2 and 4 as well). The wire routing material W is an insulated electric wire in which the conductor W1 is covered with the insulation covering portion W2. The conductor Wi is, for example, a core wire obtained by bundling a plurality of metal strands having conductivity. The conductor W1 may be a twisted core wire obtained by twisting the metal strands together. The conductor W1 may also be what is called a metal rod. The insulation covering portion W2 is an electric wire covering that covers the outer circumference of the conductor W1. The insulation covering portion W2 formed, for example, by extrusion molding of art insulation resin material (e.g., PP, PVC, or cross-linked PE, appropriately selected in view of wear resistance, chemical resistance, heat resistance or the like). The wire routing material W is formed so as to extend linearly along an axial direction X, with substantially the same diameter with respect to the extension direction (the axial direction X). In the wire routing material W, a cross-sectional shape (a cross-sectional shape in a direction intersecting the axial direction X) of the conductor W1 is roughly circular, and a cross-sectional shape of the insulation covering portion W2 is roughly annular. Thus, the entire wire routing material W has a roughly circular cross-sectional shape.

The water-stopping terminal 1 is a portion disposed at at least one end of the wire routing material W and having a water-stopping property. The water-stopping terminal 1 of the present embodiment is disposed only at one end (a first end) of the wire routing material W. The water-stopping terminal 1 is composed of, for example, various known waterproof connectors equipped with a water-stopping member such as a gasket, an anti-corrosion terminal having a water-stopping property and given anti-corrosion treatment, or a joint having a water-stopping property and given waterproof treatment.

The water-stopping property is a property to block infiltration of liquids such as water. As the water-stopping property is relatively higher, a level of blocking the infiltration of liquids such as water increases. Typically, as the water-stopping property is relatively higher, airtightness also tends to increase.

Figure 2:
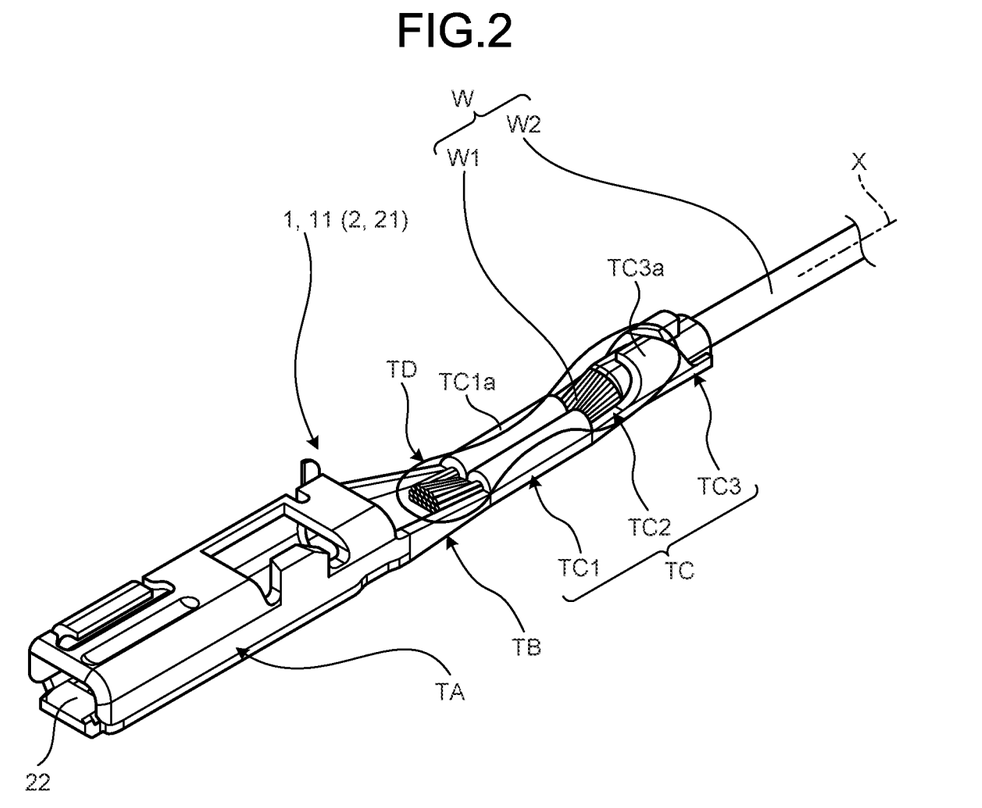
FIG. 2 is a perspective view illustrating a schematic configuration of an anti-corrosion terminal of the wire harness according to the embodiment.

FIG. 2 illustrates a schematic configuration of an anti-corrosion terminal 11 as an example of the water-stopping terminal 1. The anti-corrosion terminal 11 is a terminal fitting that is electrically connected to the conductor W1 exposed from the insulation covering portion W2 at the first end of the wire routing material W.

The anti-corrosion terminal 11 illustrated in FIG. 2 includes an electrical connection. portion TA, a link portion TB, and a wire routing material crimping portion TC. The entire anti-corrosion terminal 11 is integrally formed by a metal member having conductivity. A single sheet of sheet metal is shaped corresponding to the respective portions by various machining such as punching, pressing, and bending to three-dimensionally and integrally form the electrical connection portion TA, the link portion TB, and the wire routing material crimping portion TC of the anti-corrosion terminal 11. The electrical connection portion TA, the link portion TB, and the wire routing material crimping portion TC of the anti-corrosion terminal 11 are linked to each other sequentially from the first end toward a second end along the axial direction X (the extension direction) of the wire routing material W.

The electrical connection portion TA is a portion electrically connected to a mating terminal. The electrical connection portion TA illustrated in FIG. 2 has a female terminal shape so as to be electrically connected to the mating terminal having a male terminal shape. The link portion TB is a portion interposed between the electrical connection portion TA and the wire routing material crimping portion TC so as to link together and bring into electrical continuity between the electrical connection portion TA and the wire routing material crimping portion TC. The wire routing material crimping portion TC is a portion to which the wire routing material W is electrically connected, thereby electrically connecting the end of the wire routing material W and the anti-corrosion terminal 11. The wire routing material crimping portion TC is crimped to the wire routing material W to be disposed at the end of the wire routing material W. The wire routing material crimping portion TC includes a conductor crimping portion TC1, a middle portion TC2, and a covering crimping portion TC3. The conductor crimping portion TC1, the middle portion TC2, and the covering crimping portion TC3 of the wire routing material crimping portion TC are linked to each other sequentially from the electrical connection portion TA toward an opposite side along the axial direction X (the extension direction) of the wire routing material W. The conductor crimping portion TC1 is a portion swaged and crimped to the conductor W1 exposed from the end of the wire routing material W so as to surround the conductor W1 by a pair of barrel pieces TC1a. The conductor crimping portion TC1 is swaged and crimped to the conductor W1 to be brought into electrical continuity with and electrically connected to the conductor W1. The middle portion TC2 is a portion interposed between the conductor crimping portion TC1 and the covering crimping portion TC3 so as to link together and bring into electrical continuity between the conductor crimping portion TC1 and the covering crimping portion TC3. The covering crimping portion TC3 is a portion swaged and crimped to the insulation covering portion W2 of the wire routing material W so as to surround the insulation. covering portion W2 by a pair of barrel pieces TC3a. Here, the wire routing material crimping portion TC is what is called a separate barrel type crimping portion in which the pair of barrel pieces TC1a of the conductor crimping portion TC1 and the pair of barrel pieces TC3a of the covering crimping portion TC3 are separated from each other via the middle portion TC2.

The anti-corrosion terminal 11 having the above configuration is crimped to the end of the wire routing material W with the conductor crimping portion TC1 crimped to the conductor W1 and the covering crimping portion TC3 crimped to the insulation covering portion W2. In this state, a contact area is formed between the conductor crimping portion TC1 and the conductor W1. The anti-corrosion terminal 11 is connected to the conductor W1 of the wire routing material W in electrical continuity therewith via the contact area. The anti-corrosion terminal 11 is held by, for example, a connector housing, which is fitted with a connector housing of a mating connector to join the connectors together. The anti-corrosion terminal 11 is thereby electrically connected to the mating terminal so as to form an electrical contact area therebetween. As a result, the anti-corrosion terminal 11 is connected to the mating terminal in electrical continuity therewith via the connected area.

The conductor W1 of the wire routing material H to which the anti-corrosion terminal 11 is crimped is made of, for example, aluminum (Al) or aluminum alloys in some cases. That is, in this case, the conductor W1 is a core wire obtained by bundling a plurality of metal strands made of aluminum or aluminum alloys. Meanwhile, the anti-corrosion terminal 11 is made of a dissimilar metal different from the conductor W1, e.g., copper (Cu) or copper alloys in some cases. In this case, in the wire harness WH in which the conductor W1 is made of aluminum or aluminum alloys and the anti-corrosion terminal 11 is made of copper or copper alloys, galvanic corrosion may occur between the conductor W1 and the anti-corrosion terminal 11 due to a difference in ionization tendency therebetween when water (salt water) or the like infiltrates between them. Note that the aluminum alloys are alloys mainly made of aluminum. The copper alloys are alloys mainly made of copper, and include, for example, what is called brass.

To solve the problem, the ant-corrosion terminal 11 prevents the occurrence of such galvanic corrosion by giving anti-corrosion treatment. to prevent corrosion to the wire routing material crimping portion TC. More specifically, the anti-corrosion terminal 11 includes an anti-corrosion portion TD. The ant-corrosion portion TD covers a predetermined area of the wire routing material crimping portion TC including the conductor crimping portion TC1 so as to prevent corrosion. The anti-corrosion portion TD is formed by applying, for example, an ultraviolet (UV) curing resin that is cured by ultraviolet irradiation, to the predetermined area and irradiating the area with ultraviolet rays to cure the area. Examples of the UV-curing resin include, but are not limited to, a urethane acrylate resin. The anti-corrosion portion TD can block the infiltration of water (salt water or the like) thereinto by covering the conductor crimping portion TC1, a portion of the covering crimping portion TC3, an exposed portion or the conductor W1 or the like to stop water. With such a configuration, the ant-corrosion terminal 11 can prevent the occurrence of the galvanic corrosion or the like. Note that the anti-corrosion treatment may be given to the anti-corrosion terminal 11 by a method other than using the above anti-corrosion portion TD. For example, the anti-corrosion portion TD may be formed by using a thermosetting resin that is cured by heat, or may be provided so as to seal the entire connector housing that holds the anti-corrosion terminal 11.

The anti-corrosion terminal 11 constituting the water-stopping terminal 1 of the present embodiment is a metal terminal in which the anti-corrosion treatment to prevent corrosion. is given to the wire routing material crimping portion TC, and is formed airtight so as to have a relatively high water-stopping property as compared with that of the low water-stopping terminal 2 described later. The anti-corrosion terminal 11 can be configured to have a relatively high water-stopping property in the anti-corrosion portion TD by adjusting, for example, a material, an application position, a number of times of application of the UV-curing resin forming the anti-corrosion portion TD.

Figure 3:
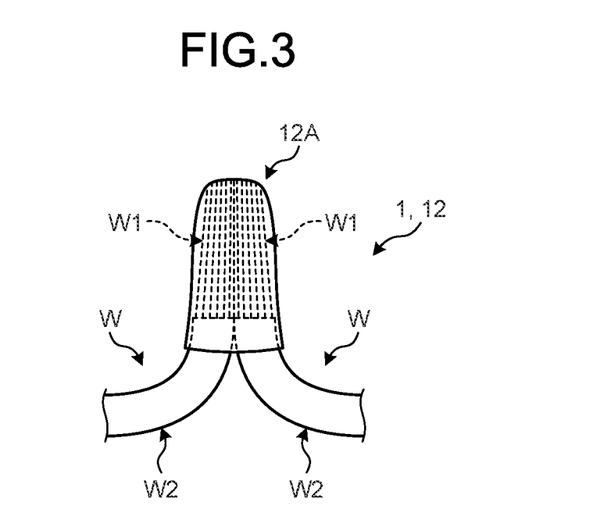
FIG. 3 is a perspective view illustrating a schematic configuration of a joint of the wire harness according to the embodiment.

FIG. 3 illustrates a schematic configuration of a joint 12 as another example of the water-stopping terminal 1. The joint 12 is a portion that joins the conductor W1 to the conductor W1 of another wire routing material W at the end of the wire routing material W and covers a joined portion of the conductors W1 with a waterproof film 12A. The conductors W1 are joined. together and brought into electrical continuity with each other by various types of bonding processes such as fusion bonding (laser welding, arc welding), thermocompression bonding, and ultrasonic bonding. The waterproof film 12A is a film having a water-stopping property and given by various types of waterproof treatment. Examples of the waterproof film 12A include, but are not limited to, a heat-shrinkable tube.

The low water-stopping terminal 2 is a portion disposed at the second. end of the wire routing material W and having a relatively lower water-stopping property than that of the water-stopping terminal 1. The low water-stopping terminal 2 of the present embodiment is disposed at the end of the wire routing material W opposite to the end where the water-stopping terminal 1 is disposed. The low water-stopping terminal 2 is composed of, for example, an anti-corrosion terminal 21 (see FIG. 2) having a lower water-stopping property than that of the water-stopping terminal 1. The anti-corrosion terminal 21 constituting the low water-stopping terminal 2 of the present embodiment differs from the anti-corrosion terminal 11 constituting the water-stopping terminal 1 in the level of the water-stopping property, and otherwise has a substantially similar configuration to the anti-corrosion terminal 11. Thus, FIG. 2 is used as a common drawing between the anti-corrosion terminal 21 constituting the low water-stopping terminal 2 and the anti-corrosion terminal 11 constituting the water-stopping terminal 1, and a common description is omitted as much as possible.

The anti-corrosion terminal 21 constituting the low water-stopping terminal 2 of the present embodiment is a metal terminal in which the anti-corrosion terminal to prevent corrosion is given to the wire routing material crimping portion TC, and has a relatively low water-stopping property as compared with. that of the anti-corrosion terminal 11 constituting the water-stopping terminal 1 described above. The anti-corrosion portion TD of the anti-corrosion terminal 21 of the present embodiment is configured as a simple anti-corrosion portion having a relatively low water-stopping property as compared with that of the anti-corrosion portion TD of the anti-corrosion terminal 11 and not requiring high air tightness. Thus, the anti-corrosion terminal 21 can be formed by a more simplified process as compared with that of the anti-corrosion terminal 11 constituting the water-stopping terminal 1. For example, the anti corrosion terminal 21 can make complicated anti-corrosion treatment for achieving high air tightness unnecessary by, for example, reducing the number of times of application of the UV-curing resin forming the anti-corrosion portion TD to less than that of the anti-corrosion portion TD of the anti-corrosion terminal 11. As a result, manufacturing man-hours and manufacturing costs can be decreased.

Figure 4:
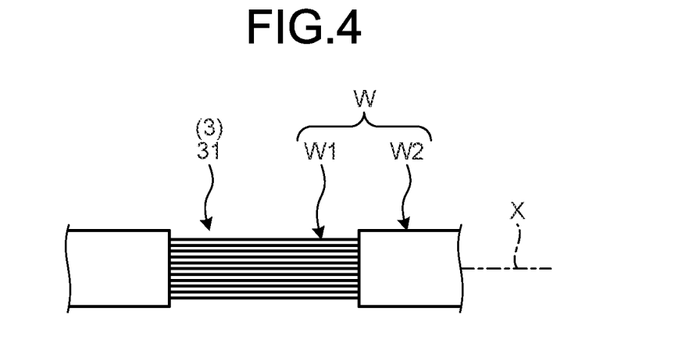
FIG. 4 is a schematic view for explaining a vent of an internal pressure adjuster of the wire harness according to the embodiment.
Figure 5:
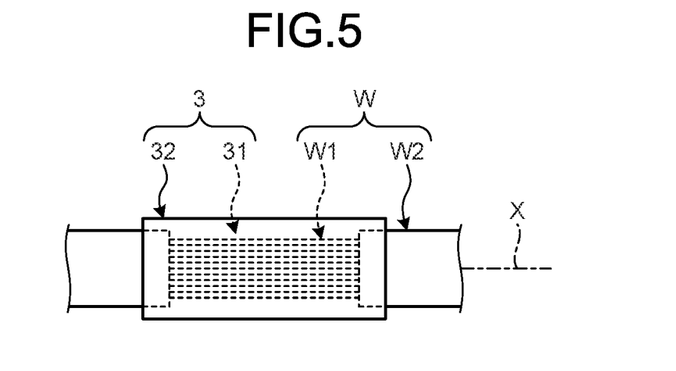
FIG. 5 is a schematic: view for explaining a moisture-permeable waterproof sheet of the internal pressure adjuster of the wire harness according to the embodiment.

The internal pressure adjuster 3 is a portion disposed at the middle position of the wire routing material W so as to adjust an internal pressure within the wire routing material W as illustrated in FIGS. 1, 4, and 5. The internal pressure adjuster 3 includes a vent 31 and the moisture-permeable waterproof sheet 32.

The vent 31 a portion disposed at the middle position of the wire routing material H so as to bring the inside and the outside of the insulation covering portion W2 into communication. Here, the middle position of the wire routing material W is any position in the wire routing material W between the end where the water-stopping terminal 1 is disposed and the end where the low water-stopping terminal 2 is disposed. That is, the vent 31 is disposed at any position in the wire routing material W between the end where the water-stopping terminal i is disposed and the end where the low water-stopping terminal 2 is disposed. The vent 31 is formed by removing the insulation covering portion W2 to expose the conductor W1 at the middle position of the wire routing material W. The vent 31 brings the inside and the outside of the insulation covering portion W2 into communication in the wire routing material W, allowing air to flow across the inside and the outside of the insulation covering portion W2.

While FIG. 4 or the like illustrates an example in which the insulation covering portion W2 is removed annularly over the entire circumference around the axial direction X (the extension direction) of the wire routing material W at the vent 31 and the vent 31 is formed annularly around the axial direction X along an outer circumferential surface of the wire routing material W, the configuration is not limited to this example. The vent 31 may be formed in a spot shape by partially removing the insulation covering portion W2 around the axial direction X of the wire routing material W.

The moisture-permeable waterproof sheet 32 is a sheet member that covers the vent 31. The moisture-permeable waterproof sheet 32 is a breathable sheet having such a property as to pass gases (e.g., moisture and water vapor) but not to pass liquids such as water. More specifically, the moisture-permeable waterproof sheet 32 passes air that flows across the inside and the outside of the insulation covering portion W2 through the vent 31, but blocks water that is to infiltrate into the insulation covering portion W2 through the vent 31. Examples of the moisture-permeable waterproof sheet 32 include, but are not limited to, BREATHRON (registered trademark) as a breathable sheet manufactured by Nitto Denko Corporation. GORE-TEX (registered trademark), EXEPOL (registered trademark), ENTRANT (registered trademark), or the like may be also used.

The moisture-permeable waterproof sheet 32 is disposed over the insulation covering portion W2 and the conductor W1 exposed from the vent 31 on the outer circumferential surface of the wire routing material W. Here, the moisture-permeable waterproof sheet 32 is disposed annularly around the axial direction X along the vent 31 so as to cover the entire vent 31. The moisture-permeable waterproof sheet 32 is sticked and fixed to an outer surface of the insulation covering portion W2 by, for example, various known pressure sensitive adhesives or adhesives.

In the present embodiment, the wire routing material W of the wire harness WH having the above configuration is wired across a first space S1 and a second space S2 divided from each other by a boundary member B such as a body member in the vehicle V. The first space S1 is a space having a relatively large temperature change as compared with that of the second space S2, and is an engine compartment or the like. Meanwhile, the second space S2 is a space having a relatively small temperature change as compared with that of the first space S1, and is a cabin or the like. The wire routing material is wired. across the first space S1 and the second space S2 through an insertion hole formed in the boundary member B so as to electrically connect a device in the first space S1 and a device in the second space S2.

The water-stopping terminal 1 of the present embodiment is located in the first space S1 having a relatively large temperature change. Meanwhile, the lows water-stopping terminal 2 and the internal pressure adjuster 3 of the present embodiment are located in the second space S2 having a relatively small temperature change.

In the above-described wire harness WH, the water-stopping terminal 1 having a water-stopping property is disposed at at least one end of the wire routing material W. In such a configuration, when a pressure difference is to be generated within the insulation covering portion W2 between the first end and the second end of the wire routing material W of the wire harness WH, air flows across the inside and the outside of the insulation covering portion W2 through the vent 31 constituting the internal pressure adjuster 3. The wire harness WH can thereby adjust the internal pressure within the insulation covering portion W2, eliminating the pressure difference. In the wire harness WH in which the vent 31 is covered with the moisture-permeable waterproof sheet 32, the moisture-permeable waterproof sheet 32 can block water that is to infiltrate into the insulation covering portion W2 through the vent 31 together with air. As a result, the wire harness WH can block the infiltration of water into the insulation covering portion W2 through the vent 31 while preventing the pressure difference from being generated within the insulation covering portion W2. Since the wire harness WH can. prevent the pressure difference from being generated within the insulation covering W2 as described above, it is possible to prevent a force in a direction to suck water and air into the insulation covering portion W2 or a force in an opposite direction from being applied to, for example, the second end of the wire routing material due to the pressure difference. As a result, the wire harness WH can appropriately achieve the water-stopping property in the entire wire harness WH.

As described above, the wire harness WH can prevent the force in the direction to suck water and air into the insulation covering portion W2 or the force in the opposite direction from being applied to the low water-stopping terminal 2 disposed at the second end of the wire routing material W. Thus, the wire harness WH can prevent such a force as to impair the water-stopping property from being applied to the low water-stopping terminal 2, thereby appropriately achieving the water-stopping property even when the low water-stopping terminal 2 has a relatively lower water-stopping property than the water-stopping terminal 1 does. That is, the wire harness WH can prevent the pressure difference from being generated within the insulation covering portion W. by using the internal pressure adjuster 3, and can prevent the force impairing the water-stopping property from being applied to the low water-stopping terminal 2. This can eliminate the need for water-stopping treatment so complicated as to achieve air tightness at the low water-stopping terminal 2. In other words, the wire harness WH can appropriately achieve the water-stopping property in the entire wire harness WH by providing the internal pressure adjuster 3 at the middle position of the wire routing material W even when the water-stopping treatment is simplified at the low water-stopping terminal 2. As a result, the wire harness WH can appropriately achieve the water-stopping property while reducing the manufacturing man-hours and the manufacturing costs.

As an example, in the above-described. wire harness WH, the low water-stopping terminal 2 is composed of the anti-corrosion terminal 21 having a lower water-stopping property than that of the water-stopping terminal 1. In such a configuration, the wire harness WH can prevent the pressure difference from being generated within the insulation covering portion W2 by using the internal pressure adjuster 3, and can prevent the force impairing the water-stopping property from being applied to the anti-corrosion terminal 21. The wire harness WH can thereby eliminate the need for complicated anti-corrosion treatment for achieving air tightness at the anti-corrosion terminal 21 constituting the low water-stopping terminal 2 by, for example, reducing the number of times of application of the UV-curing resin. forming the anti-corrosion portion TD to less than that of the anti-corrosion portion TD of the anti-corrosion. terminal 11. As a result, the wire harness WH can appropriately achieve the water-stopping property in the entire wire harness WH even when the anti-corrosion treatment is simplified at the anti-corrosion terminal 21 constituting the low water-stopping terminal 2 so as to reduce the manufacturing man-hours and the manufacturing costs.

Additionally, as described above, the wire routing material W of the wire harness WH is wired across the first space S1 having a relatively large temperature change and. the second space S2 having a relatively small temperature change in the vehicle V. The water-stopping terminal 1 of the wire harness WH is located in the first space S1, whereas the low water-stopping terminal 2 and the internal pressure adjuster 3 thereof are located in the second space S2. Thus, the wire harness WH is in an environment in which a temperature difference is easily Generated between the ends of the wire routing mater al W at the water-stopping terminal 1 and the low water-stopping terminal 2. This brings the wire harness WH into an environment in which a pressure difference is easily generated between the ends of the wire routing material W according to Boyle-Charles law.

For example, when a temperature in the first space S1 where the water-stopping terminal 1 of the wire harness WH is located. rapidly drops with an engine in the first space S1 stopped from a high-load operating state, a negative pressure is generated within the insulation covering portion W2 so as to suck air into the first space S1. The wire harness WH can adjust the internal pressure within the insulation covering portion W2 to eliminate a pressure difference generated by the negative pressure by sucking air into the insulation covering portion W2 through the vent 31 constituting the internal pressure adjuster 3 using the negative pressure. As a result, the wire harness WH can prevent the negative pressure from being applied to the anti-corrosion terminal 21 constituting the low water-stopping terminal 2 as described above. When the temperature an the first space S1 rapidly rises (or a temperature in the second space S2 rapidly drops), air flows in a direction opposite to that described above. In any case, the wire harness WH can prevent a large force from being directly applied to the anti-corrosion terminal 21 constituting the low water-stopping terminal 2 due to the pressure difference. As a result, the wire harness WH can appropriately achieve the water-stopping property in the entire wire harness WH.

In such a configuration, the internal pressure adjuster 3 is located together with the low water-stopping terminal 2 in the second space S2 having a relatively small temperature change. Thus, the internal pressure adjuster 3 can be disposed close to the low water-stopping terminal 2 in the wire harness WH, With the configuration, the wire harness WH allows the internal pressure adjuster 3 to adjust the internal pressure while minimizing an interval between the low water-stopping terminal 2 and the internal pressure adjuster 3 to reduce a space volume therebetween as much as possible. As a result, the wire harness WH can certainly prevent the pressure difference from being generated close to the low water-stopping terminal 2 and can more certainly prevent a large force from being directly applied to the anti-corrosion terminal 21 constituting the low water-stopping terminal 2. The wire harness WH can thereby more appropriately achieve the water-stopping property in the entire wire harness WH.

The wire harness according to the embodiment of the present invention is not limited to the above-described embodiment, and various changes can be made without departing from the scope of the claims.

While it has been described that the wire harness WH includes the water-stopping terminal I and the low water-stopping terminal 2 disposed at the ends of the wire routing material W, the configuration is not limited to this example. The wire harness WH does not necessarily have to include the low water-stopping terminal 2 as long as the water-stopping terminal 1 is disposed at at least one end of the wire routing material W.

While it has been described that the water-stopping terminal 1 is disposed only at one end of the wire routing material W, the water-stopping terminal 1 may be disposed at both the ends of the wire routing material W.

While it has been described that the wire routing material W is wired across the first space S1 and the second space S2 in the vehicle V, the, configuration. is not limited to this example. The wire -outing material W may be wired within one space.

Figure 6:
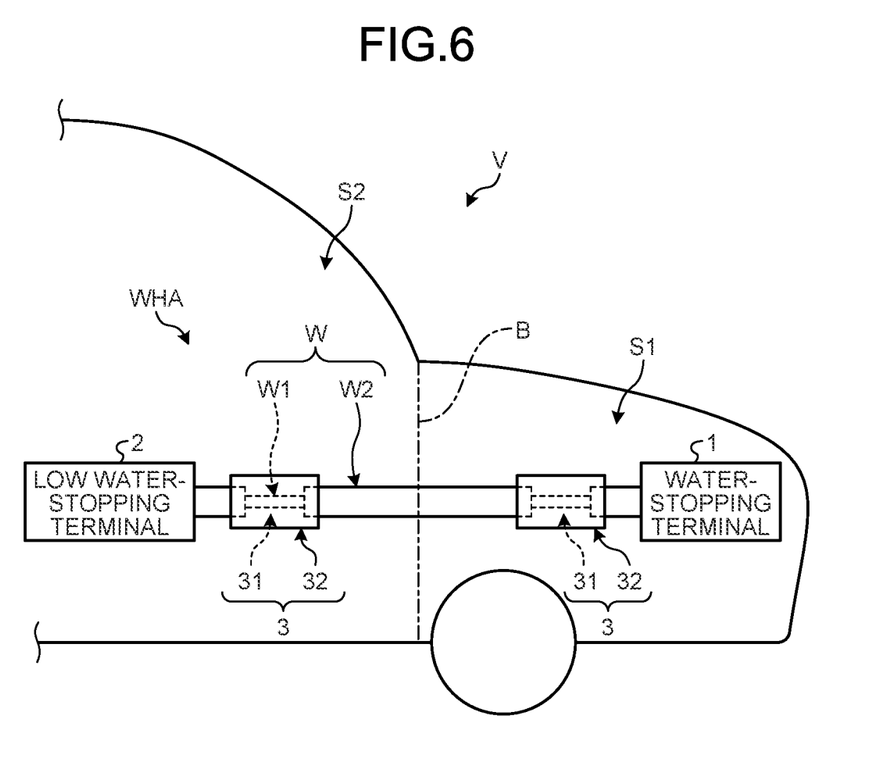
FIG. 6 is a schematic view illustrating a schematic configuration of a wire harness according to a modification.

While it has been described that the internal pressure adjuster 3 is arranged in the second space S2, the configuration is not limited to this example as long as at least one internal pressure adjuster 3 is disposed at the middle position of the wire routing material. For example, in a wire harness WEA according to a modification illustrated in FIG. 6, the internal pressure adjuster 3 is disposed in each of the first space S1 and the second space S2. Even with such a configuration, the wire harness WHA can appropriately achieve the water-stopping property in the entire wire harness WHA.

While it has been described that the vent 31 is formed annularly around the axial direction X along the outer circumferential surface of the wire routing material W by removing the insulation covering portion W2 annularly over the entire circumference around the axial direction X, the configuration is not limited to this example. The vent 31 may be partially formed in the outer circumferential surface of the insulation covering portion W2 as described above.

Figure 7:
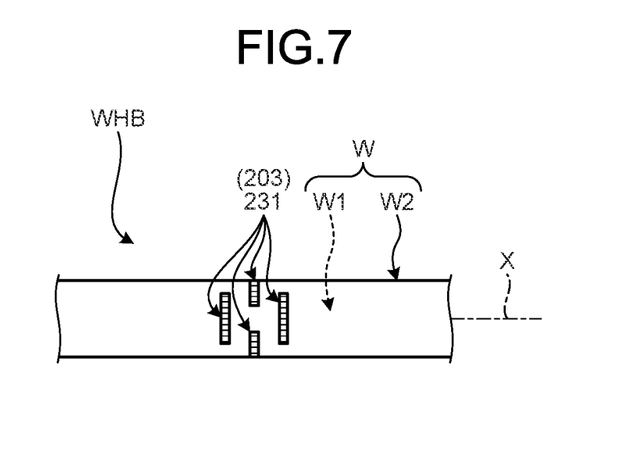
FIG. 7 is a schematic: view for explaining a vent of an internal pressure adjuster of a wire harness according to another modification.
Figure 8:
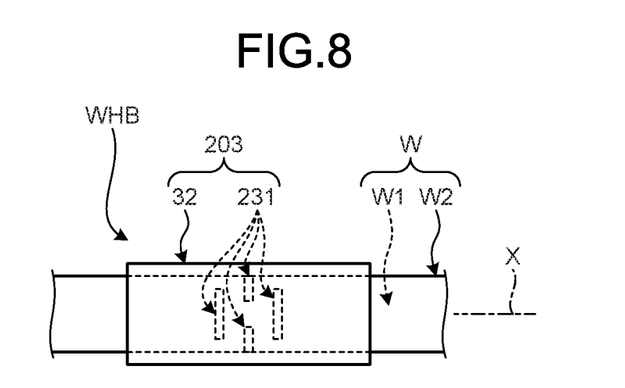
FIG. 8 is a schematic view for explaining a moisture-permeable waterproof sheet of the internal pressure adjuster of the wire harness according to the modification.

For example, a wire harness WHB according to a modification illustrated in FIGS. 7 and 8 differs from the wire harness WH in that it includes an internal pressure adjuster 203 instead of the internal pressure adjuster 3. The internal pressure adjuster 203 differs from the internal pressure adjuster 3 in that it includes a vent 231 instead of the vent 31. The wire harness WHB and the internal pressure adjuster 203 otherwise have a substantially similar configuration to those of the wire harness WH and the internal pressure adjuster 3.

The vent 231 of the present modification is formed by a slit-shaped cut that is partially formed in the insulation covering portion W2. The vent 231 is formed intermittently in an arc shape around the axial direction X along the outer circumferential surface of the insulation covering portion W2. That is, the vent 231 is not formed annularly over the entire circumference around the axial. direction X along the outer circumferential surface of the insulation covering portion W2, but is formed as the slit shaped cut in a portion of the entire circumference, plurality of the vents 231 are disposed with a space therebetween along the circumferential direction of the outer circumferential surface of the insulation covering portion W2 and the axial direction X. The vents 231 formed as described above are disposed at the middle position of the wire routing material W so as to bring the inside and. the outside of the insulation covering portion W2 into communication in a similar manner to that of the vent 31. The moisture-permeable waterproof sheet 32 is disposed so as to cover all the vents 231 formed as described above.

Even in this case, when a pressure difference is to be generated within the insulation covering portion W2 between the first end and the second end of the wire routing material W of the wire harness WHB, air flows across the inside and the outside of the insulation covering portion W2 through the vents 231 constituting the internal pressure adjuster 203 in a similar manner to that of the wire harness WH. As a result, the wire harness WHB can appropriately achieve the water-stopping property in the entire wire harness WHB in a similar manner to that of the wire harness WH. Moreover, the wire harness WHB according to the modification can prevent a decrease in bendability of the wire routing material by preventing an external force from being directly applied to the conductor W1, and can also improve machinability of the vents 231 as compared with that of the vent 31.

The wire harness according to the present embodiment may be configured by appropriately combining the constituent elements of the embodiment and the modifications described above.

In the wire harness according to the present embodiment, the water-stopping terminal having a water-stopping property is disposed at at least one end of the wire routing material. In such a configuration, when a pressure difference is to be generated within the insulation covering portion between the first end and the second end of the wire routing material of the wire harness, air flows across the inside and the outside of the insulation covering portion through the vent constituting the internal pressure adjuster. The wire harness can thereby adjust the internal pressure within the insulation covering portion, eliminating the pressure difference. In the wire harness in which the vent is covered with the moisture-permeable waterproof sheet, the moisture-permeable waterproof sheet can block water that is to infiltrate into the insulation covering portion through the vent together with air. As a result, the wire harness can block the infiltration of water into the insulation covering portion through the vent while preventing the pressure difference from being generated within the insulation covering portion. Since the wire harness can prevent the pressure difference from being generated within the insulation covering portion as described above, it is possible to prevent a force in a direction to suck water and air into the insulation covering portion or a force in an opposite direction from being applied to, for example, the second end of the wire routing material due to the pressure difference. As a result, the wire harness can appropriately achieve the water-stopping property in the entire wire harness.

Although the invention has been described with respect to specific embodiments for a complete and clear disclosure, the appended claims are not to be thus limited but are to be construed as embodying all modifications and alternative constructions that may occur co one skilled in the art that fairly fall within the basic teaching herein set forth.

What is claimed is:

1. A wire harness comprising:
    a wire routing material including an insulation covering portion having an insulation property, and a conductor having conductivity and covered with the insulation covering portion;
    a water-stopping terminal disposed at at least one end of the wire routing material and having a water-stopping property; and
    an internal pressure adjuster including a vent disposed at a middle position of the wire routing material so as to bring an inside and an outside of the insulation covering portion into communication, and a moisture-permeable waterproof sheet covering the vent.

2. The wire harness according to claim 1, further comprising:
    a low water-stopping terminal disposed at another end of the wire routing material and. having a relatively lower water-stopping property than a water-stopping property of the water-stopping terminal.

3. The wire harness according to claim 2, wherein
    the wire routing material is wired across a first space and a second space having a relatively smaller temperature change than a temperature change of the first space in a vehicle,
    the water-stopping terminal is located in the first space, and
    the low water-stopping terminal and the internal pressure adjuster are located is the second space.

4. The wire harness according to claim 2, wherein
    the low water-stopping terminal is an anti-corrosion terminal in which anti-corrosion treatment to prevent corrosion is given to a wire routing material crimping portion that is crimped to the wire routing material, the anti-corrosion terminal having a lower water-stopping property than the water-stopping property of the water-stopping terminal.

5. The wire harness according to claim 3, wherein
    the low water-stopping terminal is an anti-corrosion terminal is which. anti-corrosion treatment to prevent corrosion is given to a wire routing material crimping portion that is crimped to the wire routing material, the anti-corrosion terminal having a lower water-stopping property than the water-stopping property of the water-stopping terminal.

* * * * *